United States Patent
Shao

(10) Patent No.: US 11,112,273 B2
(45) Date of Patent: Sep. 7, 2021

(54) TWO MAGNET SENSOR SYSTEMS

(71) Applicant: KSR IP Holdings, LLC, Wilmington, DE (US)

(72) Inventor: Lingmin Shao, London (CA)

(73) Assignee: KSR IP Holdings, LLC, Wilmington, DE (US)

( * ) Notice: Subject to any disclaimer, the term of this patent is extended or adjusted under 35 U.S.C. 154(b) by 55 days.

(21) Appl. No.: 16/661,256

(22) Filed: Oct. 23, 2019

(65) Prior Publication Data

US 2020/0132509 A1 Apr. 30, 2020

Related U.S. Application Data

(60) Provisional application No. 62/750,318, filed on Oct. 25, 2018.

(51) Int. Cl.
*G01D 5/14* (2006.01)

(52) U.S. Cl.
CPC .................. *G01D 5/145* (2013.01)

(58) Field of Classification Search
CPC ................................................. G01D 5/145
See application file for complete search history.

(56) References Cited

U.S. PATENT DOCUMENTS

| | | | |
|---|---|---|---|
| 4,710,656 A | 12/1987 | Studer | |
| 5,029,511 A * | 7/1991 | Rosendahl | G10H 3/181 84/743 |
| 5,177,370 A | 1/1993 | Meister | |
| 6,411,081 B1 | 6/2002 | Spellman | |
| 6,806,702 B2 | 10/2004 | Lamb et al. | |
| 6,952,060 B2 | 10/2005 | Goldner et al. | |
| 7,009,384 B2 | 3/2006 | Heremans et al. | |
| 8,004,277 B2 | 8/2011 | Patil et al. | |
| 8,339,226 B2 | 12/2012 | Fullerton et al. | |
| 9,151,809 B2 | 10/2015 | Astegher et al. | |
| 9,624,900 B2 | 4/2017 | Phillips et al. | |
| 2009/0102460 A1 | 4/2009 | Schott et al. | |
| 2015/0008907 A1* | 1/2015 | Janisch | G01D 5/24461 324/207.25 |
| 2015/0211890 A1* | 7/2015 | Maiterth | G01R 33/075 324/207.2 |
| 2015/0226581 A1 | 8/2015 | Schott et al. | |
| 2018/0245948 A1 | 8/2018 | Lindenberger et al. | |
| 2018/0265125 A1 | 9/2018 | Yoshiya | |
| 2018/0280714 A1 | 10/2018 | Souder | |

FOREIGN PATENT DOCUMENTS

WO 2018/109057 A1 6/2018

* cited by examiner

*Primary Examiner* — Clayton E. LaBalle
*Assistant Examiner* — Michael A Harrison
(74) *Attorney, Agent, or Firm* — Dinsmore & Shohl LLP

(57) ABSTRACT

Embodiments described herein are directed to a sensing system. The sensing system includes a pair of sensors, a target, and a pair of magnets. The target is configured to move along an axis of movement with respect to the pair of sensors. The pair of magnets are coupled to the target. Each of the pair of magnets has a first end and a second end. Each of the second ends of the pair of magnets are positioned axially adjacent to one another in a system longitudinal direction. The pair of magnets provide a greater field strength for determining a position of the target.

19 Claims, 8 Drawing Sheets

TWO MAGNET SENSOR SYSTEMS

CROSS REFERENCE TO RELATED APPLICATIONS

This utility patent application claims priority from U.S. Provisional Patent Application Ser. No. 62/750,318, filed on Oct. 25, 2018, the entire contents of which is incorporated herein in its entirety.

TECHNICAL FIELD

This invention relates to linear sensor systems, and in particular, to targets having two magnets to geometrically change the magnetic fields to determine the position of the target.

BACKGROUND

Magnetic sensors are used to determine position of objects. The sensors measure the strength of a magnetic field. The sensors include Hall effect sensors which produce a voltage proportioned to the strength of a field of a magnet components of the magnetic field. However, the automotive application position sensors need to be robust to stray magnetic fields.

Accordingly, a need exists for a magnetic sensor arrangement which provides better linearity of conventional single magnet design and is relatively immune to the effects of stray magnetic fields.

SUMMARY

In one embodiment, a sensing system is provided. The sensing system includes a pair of sensors, a target, and a pair of magnets. The target is configured to move along an axis of movement with respect to the pair of sensors. The pair of magnets are coupled to the target. Each of the pair of magnets has a first end and a second end. Each of the second ends of the pair of magnets are positioned axially adjacent to one another in a system longitudinal direction. The pair of magnets provide a greater field strength for determining a position of the target.

In another embodiment, a Hall effect sensing system is provided. The Hall effect sensing system includes a processing unit, a pair of Hall effect sensors, a target, and a pair of magnets. The pair of Hall effect sensors are spaced apart defining a gap. The pair of Hall effect sensors are communicatively coupled to the processor unit. The target is configured to move along an axis of movement with respect to the pair of sensors. The pair of magnets are coupled to the target. Each of the pair of magnets has a first end and a second end. Each of the second ends of the pair of magnets are positioned axially adjacent to one another in a system longitudinal direction. The pair of magnets provide a greater field strength for determining a position of the target.

These and additional features provided by the embodiments described herein will be more fully understood in view of the following detailed description, in conjunction with the drawings.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION

Embodiments described herein are directed to a linear sensing system that includes a pair of magnets mounted with like poles end to end in an axial and planer direction. That is, each of the pair of magnets have a first end and a second end. The first end of the pair of magnets is a north pole and the second end of the pair of magnets is a south pole. The pair of magnets are arranged such that both second ends, or south poles, are adjacent to one another in the axial direction. The pair of magnets are coupled to a target, which moves along an axis of linear movement. The system further includes a pair of magnetic Hall effect sensors spaced apart a distance along a plane parallel to the axis of movement.

The system further includes a processor unit configured to detect and determine a differential magnetic field sensed by the pair of Hall effect sensors. The differential magnetic field is proportional to the position of the target. The sensors are configured to measure two components Bx and Bz of the magnetic field. Bx and Bz represent vectors for the field strength in the X and Z directions. The differential magnetic field is a difference between a sensed magnetic field in a Bx and Bz direction by one of the pair of sensors and the sensed magnetic field in a Bx and Bz direction by the other one of the pair of sensors. Use of two magnets produces a greater field strength, which is immune to stray effects of magnetic fields. The system uses a differential measurement principle to determine the position of the target.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 1:
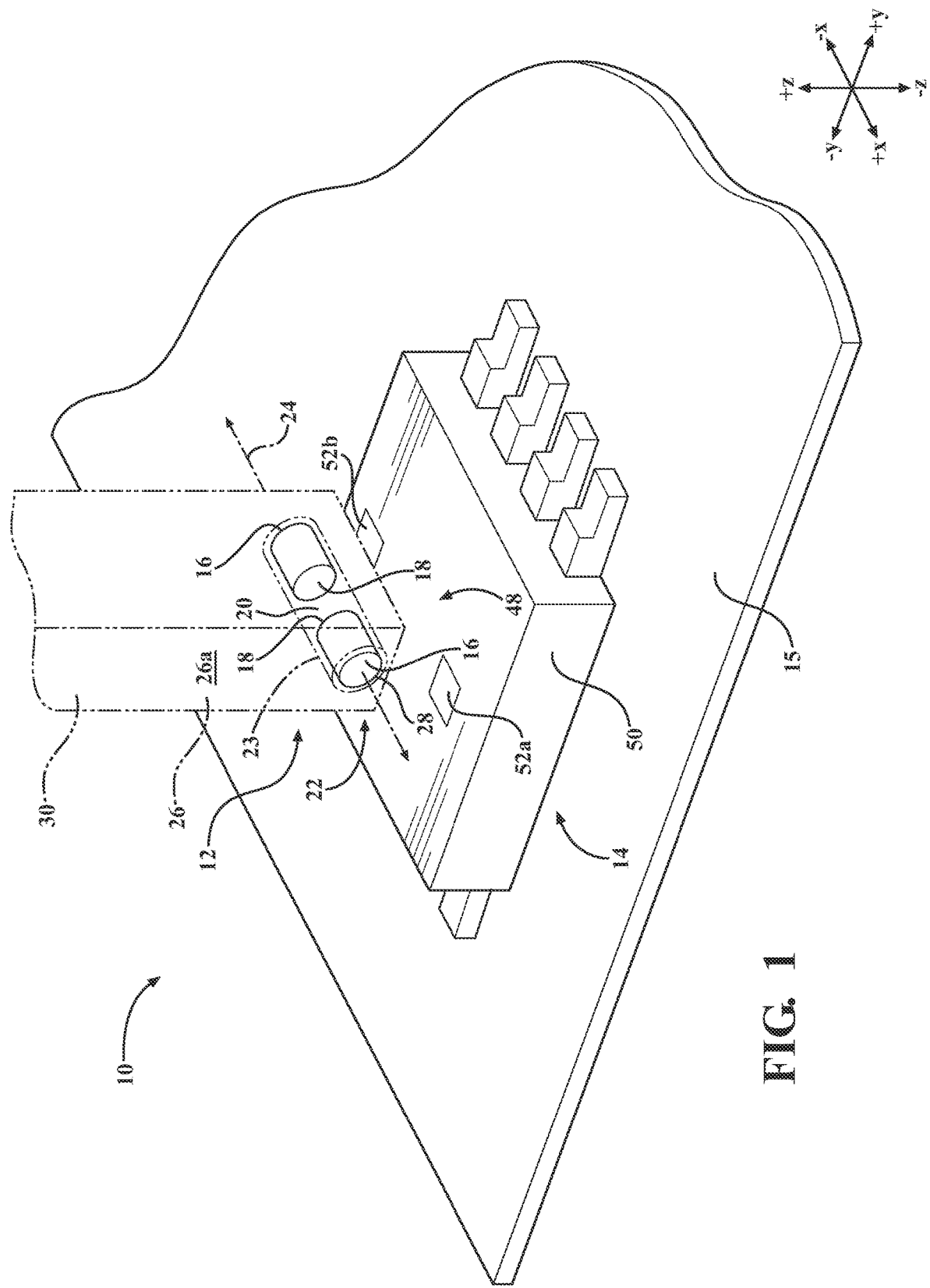
FIG. 1 schematically depicts a perspective view of a linear sensing system according to one or more embodiments herein.

As used herein, the term "system longitudinal direction" refers to the cross-direction of the system (i.e., in a +/−X direction of the coordinate axes depicted in FIG. 1). The term "system lateral direction" refers to the forward-rearward direction (i.e., along the Y axis of the coordinate axes depicted in FIG. 1), and is transverse to the longitudinal direction. The term "system vertical direction" refers to the upward-downward direction of the system (i.e., in the +/−Z direction of the coordinate axes depicted in FIG. 1).

Figure 2:
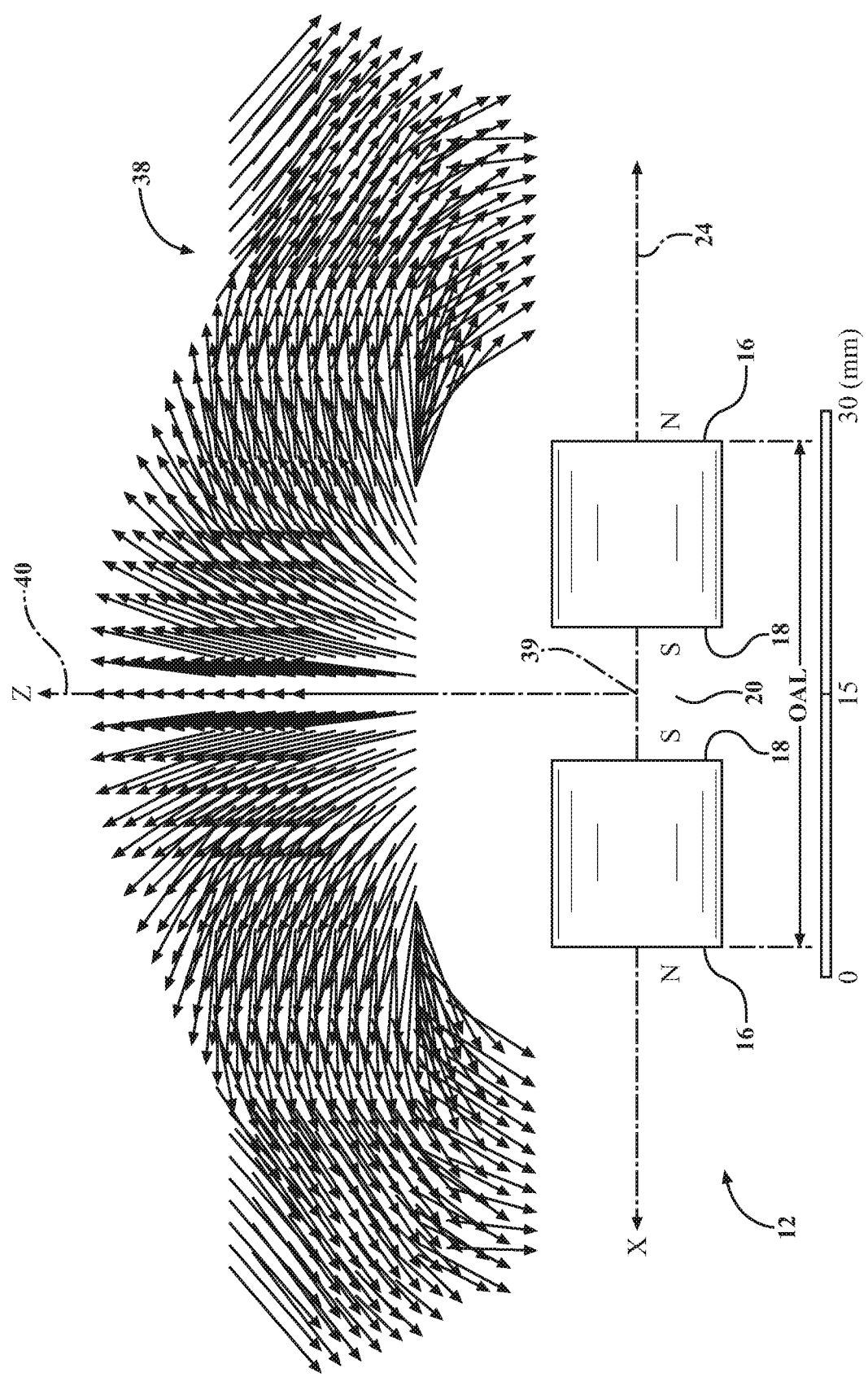
FIG. 2 schematically depicts an isolated view of a pair of magnets of the linear sensing system of FIG. 1 and a magnetic field influenced by the pair of magnets according to one or more embodiments herein.
Figure 3:
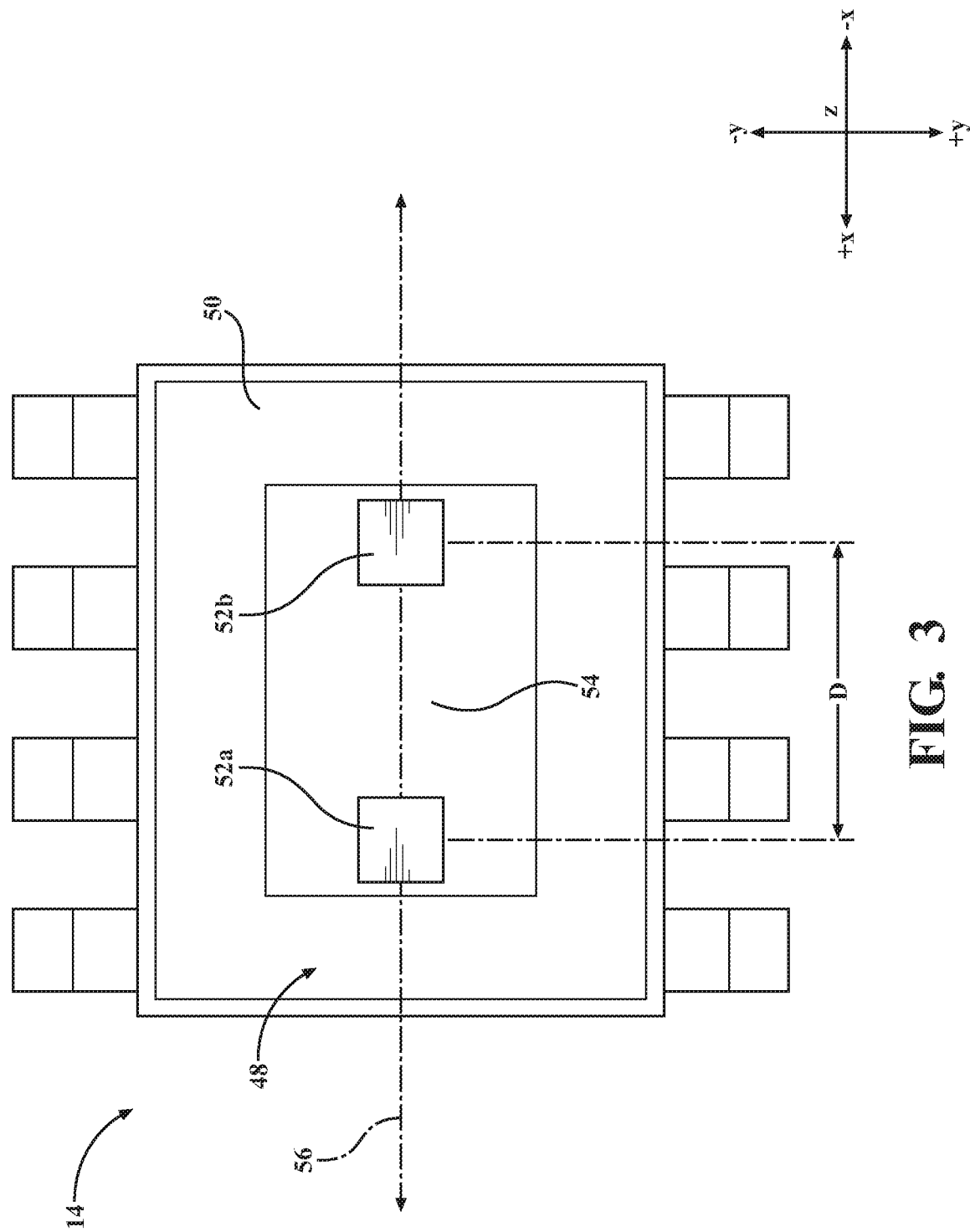
FIG. 3 schematically depicts an isolated view of a processing unit of the linear sensing system of FIG. 1 according to one or more embodiments herein.

Referring initially to FIGS. 1-3, a schematic depiction of a system, generally designated 10, is provided. The system 10 includes a pair of magnets 12 and a sensor assembly 14 mounted to a printed wiring assembly 15 (PWA). The PWA 15 may also be known as a printed wiring board, printed circuit board (PCB), circuit board, a printed circuit assembly, or simply a board. The PWA 15 may be a flat plastic or fiberglass board on which interconnected circuits and components are laminated or etched. The PWA 15 may be operable to measure a change in the magnetic field, as discussed in greater detail herein. Chips and other electronic components are mounted on the circuits such the chips and other electronic components are communicatively coupled such that signals may pass between them.

Each of the pair of magnets 12 includes a first end 16 and a second end 18. The first end 16 is a north pole and the second end 18 is a south pole. The pair of magnets 12 are spaced apart to define a gap 20 between each of the pair of magnets 12. The pair of magnets 12 are mounted or coupled to a target 22, which may act as a coupler, and each of the pair of magnets 12 are arranged such that like poles are end to end. That is, the pair of magnets 12 may be mounted with each first end 16 arranged adjacent to one another or, as illustrated, each second end 18 arranged adjacent to one another. Each of the pair of magnets 12 are fixedly coupled to the target 22 such that each one of the pair of magnets 12 does not move or shift with respect to the target 22, rather the target 22 and the pair of magnets 12 move in unison along an axis of movement 24. The pair of magnets 12 may be fixedly coupled to the target 22 via an adhesive, weld, solider, a snap fit, a press lock, a fastener such as a setscrew, and bolt and nut, a screw, a rivet, and the like.

The pair of magnets 12 may permanent magnets, temporary magnets, electromagnets, and the like. Further, the pair of magnets 12 may be a ceramic material, a ferrite material, Alnico magnets, and/or other material such as SmCo or NdFe magnet and the like. The pair of magnets 12 may be each be a bar magnet, a rod magnet, a plate magnet and the like. As such, the magnetization direction could be axial or diametrical. As such, it should be appreciated that the magnet shape and material is flexible. Further, it should be appreciated that in embodiments, each of the pair of magnets 16 are symmetrical in size with opposite polarities. In other embodiments, each of the pair of magnets 16 are unsymmetrical in size with opposite polarities.

In some embodiments, each of the pair of magnets 12 may positioned with a plastic carrier 23 end to end with like poles adjacent to one another. In embodiments, each of the pair of magnets 12 are snap fit into the carrier 23. In other embodiments, each of the pair of magnets 12 are fastened into the carrier 23 via fasteners such as set screws, bolt and nuts, hook and loop, rivets, and the like, via adhesives, via weld and/or solider, and the like. In embodiments, the carrier 23 is a plastic material such as a polymer, a PEEK, and the like.

In other embodiments, the pair of magnets 12 may be each individually or together be encapsulated in an encapsulation material that is over molded over a portion of the pair of magnets 12, over a portion of the target 22, and the like. In some embodiments, the encapsulation material is a thermoset material. In other embodiments, the encapsulation material is a polymer, a PEEK, and the like.

In some embodiments, the target 22 may be a first end 28 of an elongated member 26, such as a shaft, a push rod, and the like. The elongated member 26 may have a second end 30 attached to a device that causes the elongated member 26 to move in the axis of movement 24. In other embodiments, the target 22 may be positioned on an outer surface 26a of the elongated member 26 positioned between the first and second ends 28, 30 such that the outer surface 26a moves along the axis of movement 24. In other embodiments, the target 22 may be positioned on or within a housing, a plate, a member, and the like. It is understood that the target 22 is not limited to an elongated member 26 and that the target 22 may be positioned on any member including an elastic member, a resilient member, and the like.

It should be appreciated that, in embodiments, the carrier 23 may be coupled to the target 22 such that the pair of magnets 12 influence the magnetic field at the target 22, as discussed in greater detail herein. In other embodiments, the carrier 23 may be coupled to the target 22 such that the pair of magnets 12 form at least a portion of the target 22 and where the pair of magnets 12 still influence the magnetic field at the target 22. The carrier 23 may be coupled to the target 22 via fasteners such as set screws, bolt and nuts, hook and loop, rivets, and the like, via adhesives, via weld and/or solider, and the like.

Figure 4:
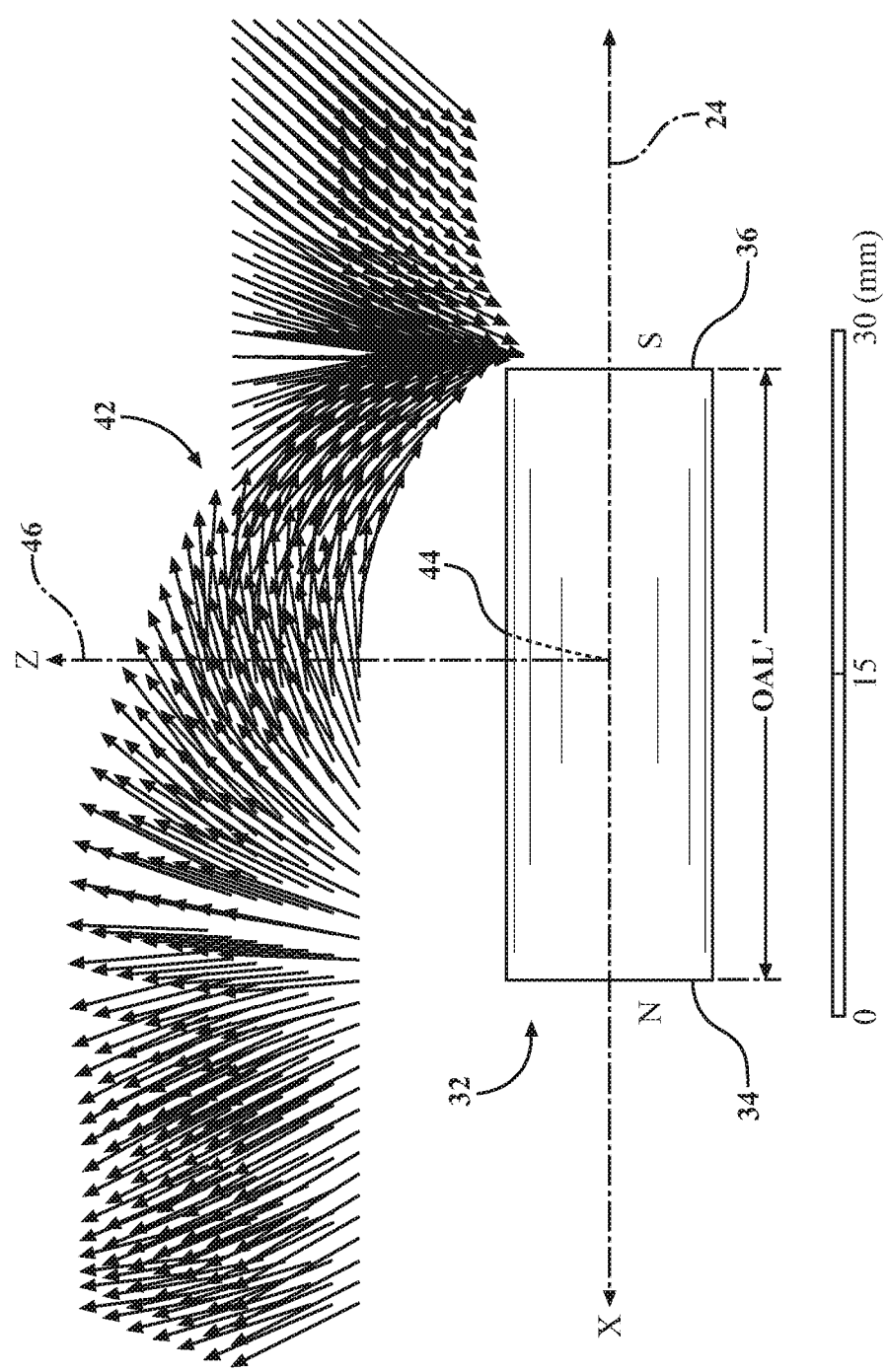
FIG. 4 schematically depicts an isolated view of a prior art traditional single magnet and a magnetic field influenced by the single magnet according to one or more embodiments herein.

Referring now to FIG. 4 and still referring to FIG. 2, each of the pair of magnets 12 are spaced apart such that an axial overall length OAL and diameter of the pair of magnets 12 is equal to the axial overall length. OAL' and diameter of a conventional or traditional single magnet application 32 with a single pole on each end 34, 36. For instance, and without limitation, the pair of magnets 12 are two cylindrical 9×10 mm magnets that are spaced about 7 mm apart produce the axial overall length OAL of about 27 mm and a magnetic field gradient of 4 mT/min (FIG. 7), as discussed in greater detail herein. The traditional single pole magnet 32 is a 9×27 mm magnet such that the axial overall length OAL' is equivalent to and of the same material as the pair of magnets 12. The traditional single pole magnet 32 produces a field gradient of only 3.5 T/mm (FIG. 7), as discussed in greater detail herein. As such, the pair of magnets 12 produce a stronger field when placed with like poles end to end. It should be appreciated that the OAL and OAL' are not limited herein and that any OAL and OAL' may be used to achieve the same result.

Referring now to FIG. 2, the pair of magnets 12 produce a magnetic field 38 illustrated by the numerous arrows in FIG. 2. The magnetic field 38 is influenced by the pair of magnets 12. For example, with both second ends 18, or like poles, arranged adjacent to one another, the magnetic field 38 is aligned with the Z-axis 40, which is equally positioned between the pair of magnets 12 in the gap 20. That is, a center point 39, nadir or exact middle of the gap 20 between the pair of magnets 12 is a most vertical portion of the magnetic field 38 illustrated by the Z axis 40. At this position, a Bx component measurement may be zero and a Bz component measurement may be 90. As such, it should be appreciated that at this position, the magnetic field 38 is transverse, or perpendicular to the axis of movement 24. It should be appreciated that either side of the Z-axis 40, the magnetic field 38 begins to bend away from the Z-axis 40 in which the further away from the center point 39 or Z-axis 40, the more bend of the magnetic field 38. That is, there is an increasing amount of or more of the Bx component and decreasing amount of or less of the Bz component than at the center point 39 or Z-axis 40. The magnetic field 38 becomes scattered when there is more influence from the first end 16 than the second end 18 of the pair of magnets 12.

Further, the direction of the magnetic field 38 outside of the first end 16 of the pair of magnets is nearly opposite that of the magnetic field 38 near or at the center point 39 or Z-axis 40. That is, the limiting influence of the south pole or second end 18 of the pair of magnets 12 and the increased influence of the north pole or first end 16 of the pair of magnets 12 affects the Bx and Bz components of the magnetic field 38 such that, in this instance, there is an increasing amount of the Bx component and the Bz component may be in the opposite direction than at the center point 39 or Z-axis 40 which causes the vectors of the magnetic field 38 to change to an inverse direction. It is appreciated that the magnetic field 38 mirrors each side of the center point 39 or Z-axis 40 such that the magnetic field is symmetric. It is also appreciated that as the pair of magnets 12 move with the target 22, the magnetic field 38 changes and is sensed by the sensor assembly 14 determining the changes in magnetic field 38 using a differential measurement principles, as discussed in greater detail herein. Further, in embodiments, the greater field strength produced by the pair of magnets 12 arranged pole to pole is immune to stray effects of magnetic fields.

Referring back to FIG. 4, the traditional single magnet 32 also produces a magnet field illustrated by the numerous arrows in FIG. 2. The magnetic field 42 is influenced by first and second end 34, 36 of the traditional single magnet 32. For example, the magnetic field 42 is at a nearly vertical portion near an edge of the first end 34, or north pole. At this position, the Bx measurement may be zero and the Bz component may be 90. As such, it should be appreciated that at this position, the magnetic field 42 is transverse, or perpendicular to the axis of movement 24. Further, it should be appreciated that at a center point 44 of the traditional single magnet 32, the magnet field is bending with respect to the Z-axis 46 in which that closer the magnetic field 42 is to the second end 36, or south pole, the bend is greater until the magnetic field 42 is inversely vertical at an edge of the second end 36. That is, there is an increasing amount of or more of the Bx component and decreasing amount of or less of the Bz component as the magnetic field 42 approaches the second end 36 and at the second end 36, at least a portion of the magnetic field 42 has a zero Bx component and a −90 Bz component such that there is an inverse vertical field 40. The magnetic field is remains inverted with respect to the Z-axis 46 and bends towards the second pole 36. It is appreciated that this arrangement, while stationary or moving is not immune to stray effects of magnetic fields.

Referring back to FIGS. 1-3, the sensor assembly 14 may include a pair of sensors 48 and a processing unit 50. The processing unit 50 may be any embedded system that controls one or more of the electrical system or subsystems in an automotive application. Processing units may be an electronic control unit (ECU) include electronic/engine control module (ECM), powertrain control module (PCM), transmission control module (TCM), brake control module (BCM or EBCM), central control module (CCM), central timing module (CM), general electronic module (GEM), body control module (BCM), suspension control module (SCM), control unit, or control module. As such, it should be appreciated that the embodiments disclosed herein may be applicable to each one of these automotive applications/systems.

The pair of sensors 48 includes a first sensor 52a and a second sensor 52b. The pair of sensors 48 are magnetic Hall effect sensors configured to sense magnetic flux changes in the magnetic field 38 in the Bx, By and Bz directions. As such, the pair of sensors 48 utilize Hall effect technology to sense and determine movement of the pair of magnets 12 and the target 22 within the system 10. In some embodiments, the processor unit 50 includes the pair of sensors 48. That is, each one of the pair of sensors 48 is a Hall chip provided within the processor unit 50 and separated by a predetermined distance D defining a gap 54. Each of the pair of sensors 48 sense the magnetic field 38 provided by the pair of magnets 12 that move along the axis of movement 24 using Hall effect principles. The pair of sensors 48 may be any magnetic IC that measures a magnetic field direction including Hall-effect and anisotropic magnetoresistance (AMR) chips. In other embodiments, the pair of sensors 48 are communicatively coupled to the processor 50 but not necessarily integrated within the processor 50.

The Hall effect is the production of a voltage difference (the Hall voltage) across an electrical conductor, transverse to an electric current in the conductor and a magnetic field perpendicular to the current. The pair of sensors 48, or Hall chips, measures this. The Hall coefficient is defined as the ratio of the induced electric field to the product of the current density and the applied magnetic. The Hall effect is due to the nature of the current in a conductor. Current consists of the movement of many small charge carriers, typically electrons, holes, ions or all three. When a magnetic field is present that is not parallel to the direction of motion of moving charges, these charges experience a force, called the Lorentz force. When such a magnetic field is absent, the charges follow approximately straight, 'line of sight' paths between collisions with impurities, phonons, etc. However, when a magnetic field with a perpendicular component is applied, their paths between collisions are curved so that moving charges accumulate on one face of the material. This leaves equal and opposite charges exposed on the other face, where there is a scarcity of mobile charges. The result is an asymmetric distribution of charge density across the Hall element that is perpendicular to both the 'line of sight' path and the applied magnetic field. The separation of charge establishes an electric field that opposes the migration of a further charge, so a steady electrical potential is established for as long as the charge is flowing.

As the pair of magnets 12 move with the target 22, the magnetic field 38 changes and is sensed by the pair of sensors 48 of the sensor assembly 14. This movement is determined by the changes in magnetic field 38 and thus the position of the target 22. That is, the pair of sensors 48 are spaced apart the distance D along a plane 56 that is parallel to the axis of movement 24 such that the change in magnetic field 38 is determined by the pair of sensors 48. Each of the pair of sensors 48 are configured to detect or measure two components Bx and Bz of the magnetic field 38. Bx and Bz represent vectors for the field strength in the X and Z directions.

To determine a position of the target 22, the first sensor 52a of the pair of sensors 48 measures $Bx_1$ and $Bz_1$ and the second sensor 52b of the pair of sensors 48 measures $Bx_2$ and $Bz_2$. The processor unit 50 then computes the differential magnetic field for the position using the following equation: $dBx=Bx_1-Bx_2$ and $dBz=Bz_1-Bz_2$ and an output signal is the function equation: a tan 2 (dBx, dBz), which is proportional to the axial location of the target 22 along the axis of movement 24. That is, the arc tangent function with two arguments (i.e., the differential signal dBx and the differential signal dBz) is used to determine the axial location of the target 22 along the axis of movement 24. In embodiments, the axis of movement 24 is linear. In other embodiments, the axis of movement 24 is arcuate, curvilinear, and the like.

As such, the difference of components Bx and Bz of the magnetic field 38 taken from the first sensor 52a and the second sensor 52b of the pair of sensors 48 provides a differential computation for determining the position of the target 22 based on the manipulation of the magnet field 38 by the pair of magnets 12. This differential computation is simply not possible in this manner with the traditional single pole magnet 32 (FIG. 4) and the produced magnetic field 42. It is understood that the arrangement of the pair of magnets 12 produces a stronger field, which is uniform, and is less affected by stray magnet fields commonly found in automotive applications. Further, it is understood that the differential measurement principle is immune to stray magnet fields commonly found in automotive applications.

Figure 5:
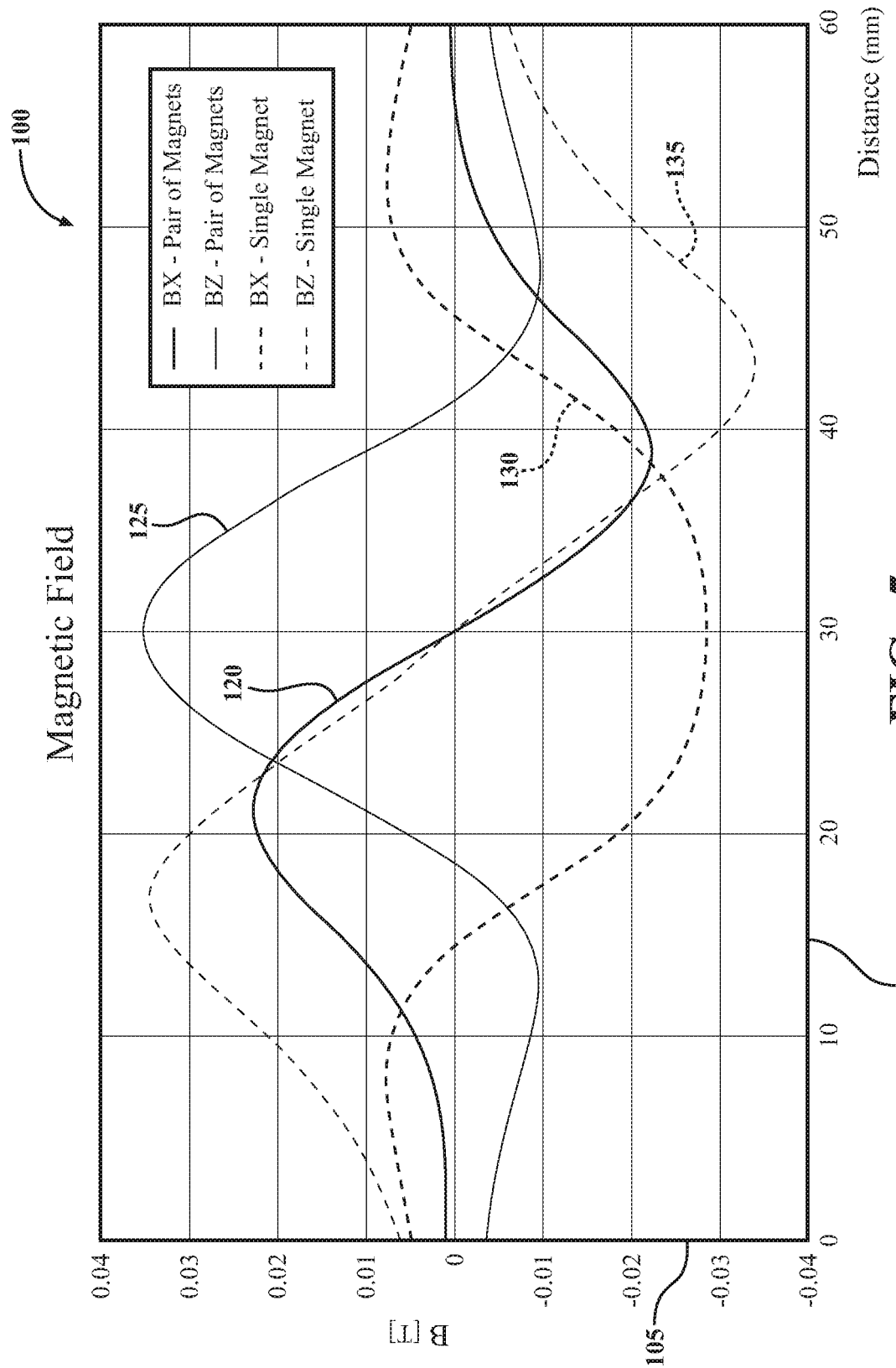
FIG. 5 schematically depicts a plot of a simulated magnetic field according to one or more embodiments herein.

Now referring to FIG. 5, a simulated magnetic field 100 is graphically represented having an ordinate 105 as a field measurement in Tesla and an abscissa 110 as a distance measured in millimeters, described in further detail herein. Plotted is a Bx component of the magnetic field 120 of the system 10 (FIG. 1) (illustrated as a bold solid line) and a Br component of the magnetic field 125 of the system 10 (FIG. 1) (illustrated as a solid line without bolding). Further plotted is a Bx component of the magnetic field 130 in the traditional single magnet application 32 (FIG. 4) (illustrated as a bold dashed line) and a Bz component of the magnetic field 135 in the traditional single magnet application 32 (FIG. 4) (illustrated as a dashed line without holding). As illustrated, the Bx and Bz components of the magnetic field 120, 125 of the system 10 produces a better sinusoidal curve with improved symmetry. Further, each component the magnetic field 120, 125 of the system 10 produces a greater amplitude than the components 130, 135 of the traditional single magnet application 32.

Figure 6:
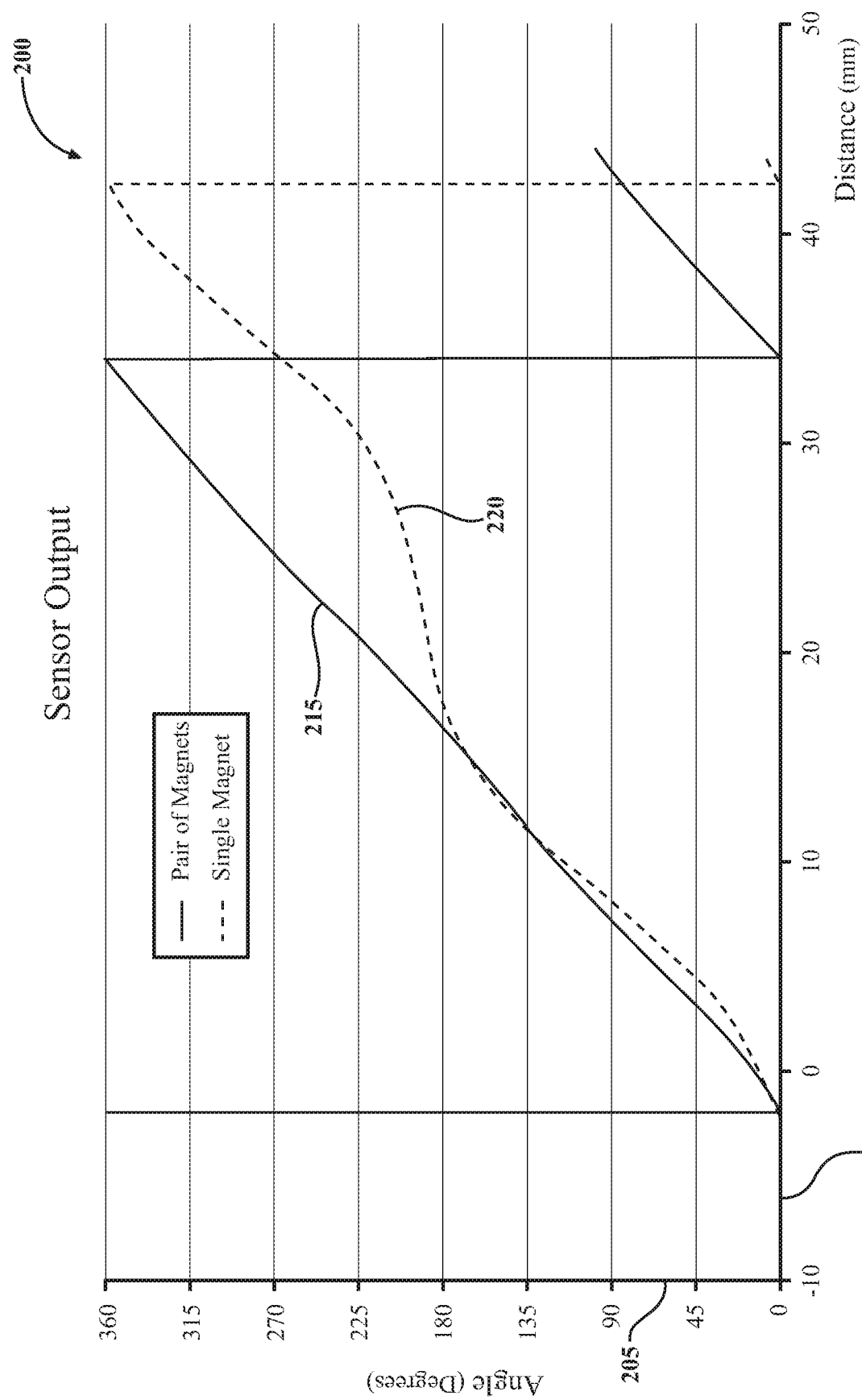
FIG. 6 schematically depicts a plot of a simulated sensor output according to one or more embodiments herein.

Now referring to FIG. 6, a simulated sensor output 200 is graphically represented having an ordinate 205 as an angle measurement in degrees and an abscissa 210 as a distance measured in millimeters, described in further detail herein. Plotted is an output signal 215 of the system 10 (FIG. 1) (illustrated as a solid line) and an output signal 220 of the traditional single magnet application 32 (FIG. 4) (illustrated as a dashed line). As illustrated, the output signal 215 generated from the differential measurement of Bx and Br components of the magnetic field 38 (FIG. 2) caused from the pair of magnets 12 (FIG. 2) produces a better, or improved, linearity than that of the output signal 220 generated from the traditional single magnet application 32 (FIG. 4). That is, the output signal 215 of the system 10 (FIG. 1) has significantly less deviation from a straight line over a specific distance than that of the output signal 220 generated from the traditional single magnet application 32 (FIG. 4).

Figure 7:
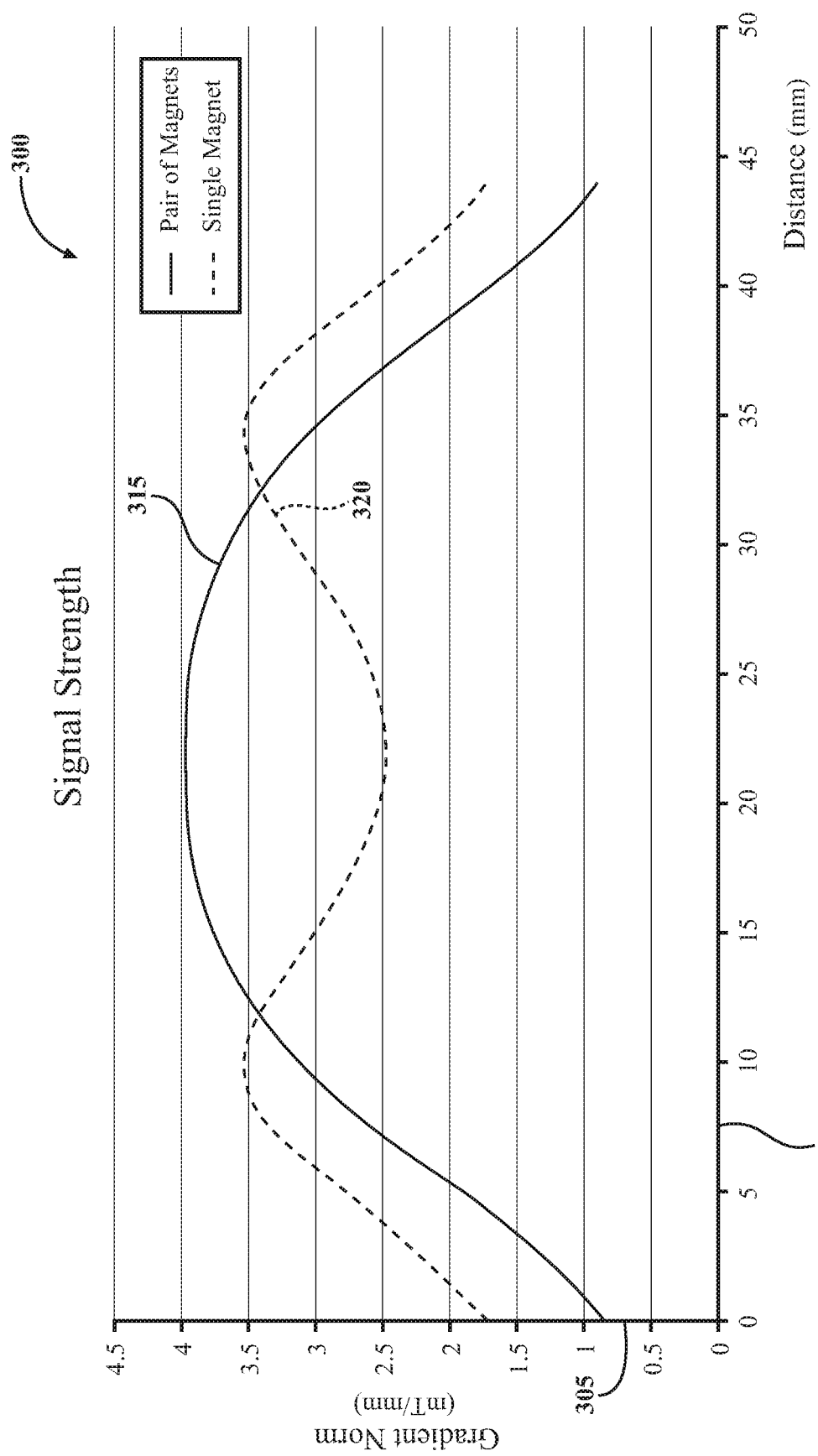
FIG. 7 schematically depicts a plot of a simulated signal strength according to one or more embodiments herein.

Now referring to FIG. 7, a simulated signal strength 300 is graphically represented having an ordinate 305 as a gradient norm in mT/mm and an abscissa 310 as a distance measured in millimeters, described in further detail herein. Plotted is a signal strength 315 of the system 10 (FIG. 1) (illustrated as a solid line) and a signal strength 320 of the traditional single magnet application 32 (FIG. 4) (illustrated as a dashed line). As illustrated, the signal strength 315 generated from the differential measurement of Bx and Bz components of the magnetic field 38 (FIG. 2) caused from the pair of magnets 12 (FIG. 2) produces a better or improved signal strength at the middle of the travel although the total magnet volume of the arrangement of pair of magnets 12 (FIG. 2) is smaller, or less than, the traditional single magnet application 32 (FIG. 4). As such, the signal strength 315 produced by the system 10 (FIG. 1) has a peak magnetic field gradient of approximately 4 mT/mm versus an approximate 3.5 T/mm signal strength 320 produced by the traditional single magnet application 32 (FIG. 4). Further, during the travel of the target 22 (FIG. 1) and the pair of magnets 12 (FIG. 2), the signal strength 315 peaks at 4 mT/mm versus the signal strength 320 having a 2.5 mT/mm during travel produced by the traditional single magnet application 32 (FIG. 4).

Figure 8:
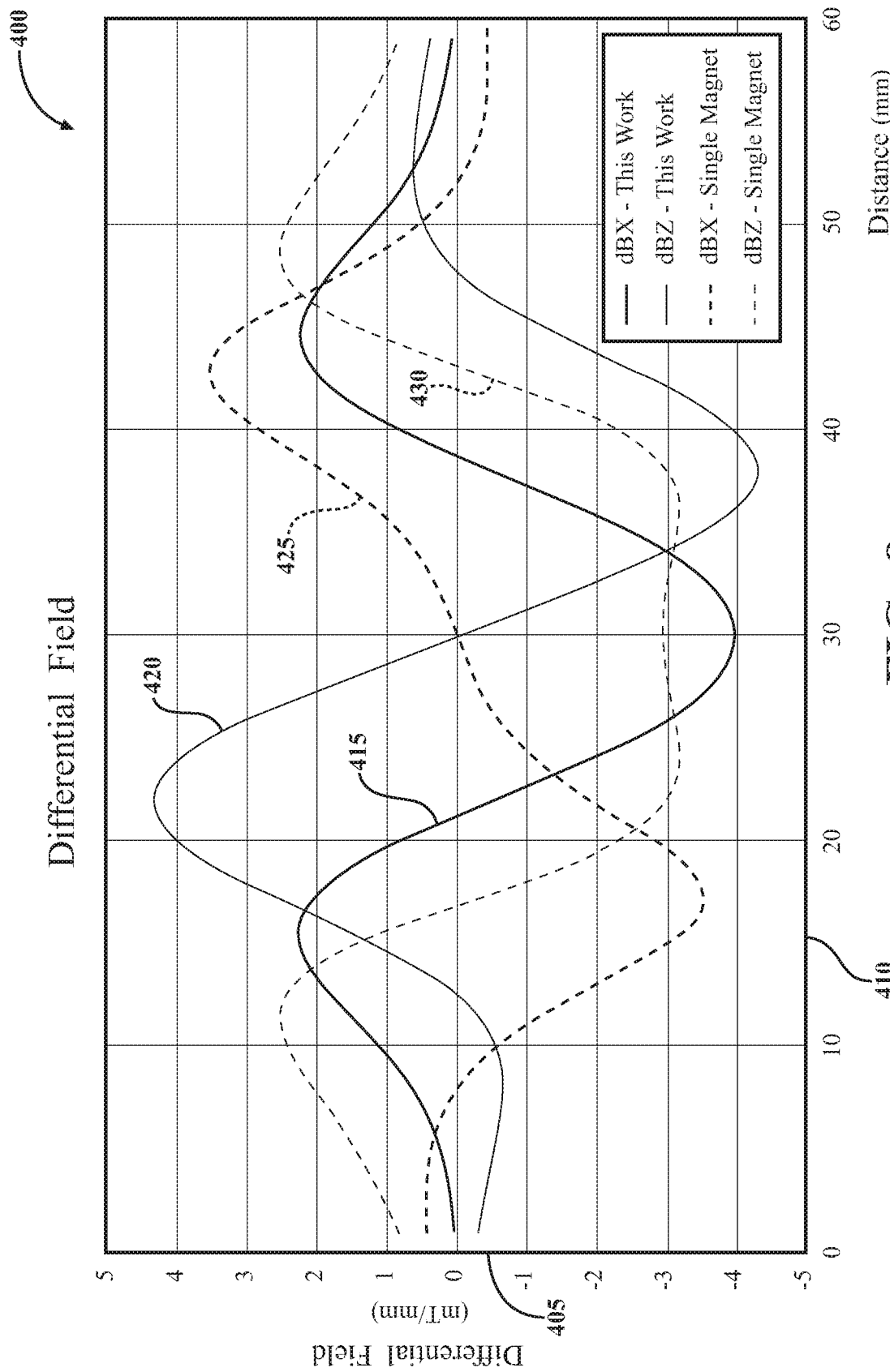
FIG. 8 schematically depicts a plot of a simulated differential field according to one or more embodiments herein.

Now referring to FIG. 8, a simulated differential field 400 is graphically represented having an ordinate 405 as a differential field measurement in mT/mm and an abscissa 410 as a distance measured in millimeters, described in further detail herein. Plotted is a differential Bx component of the magnetic field 415 of the system 10 (FIG. 1) (illustrated as a bold solid line) and a differential Bz component of the magnetic field 420 of the system 10 (FIG. 1) (illustrated as a solid line without bolding). Further plotted is a differential Bx component of the magnetic field 425 in the traditional single magnet application 32 (FIG. 1) (illustrated as a bold dashed line) and a differential Bz component of the magnetic field 430 in the traditional single magnet application 32 (FIG. 1) (illustrated as a dashed line). As illustrated, the differential Bx and Bz components of the magnetic field 415, 420 of the system 10 (FIG. 1) produces a better, or improved, sinusoidal curve with improved symmetry. Further, each differential component the magnetic field 415, 420 of the system 10 (FIG. 1) produces a greater amplitude than the differential components 425, 430 of the traditional single magnet application 32 (FIG. 4).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sensing system comprising:
   a pair of sensors;
   a target moves along a linear axis of movement with respect to the pair of sensors; and
   a pair of magnets coupled to the target, each of the pair of magnets having a first end and a second end and each end having an opposite polarity, each of the second ends of the pair of magnets are positioned axially adjacent to one another in a system longitudinal direction,
   wherein the pair of magnets provide a symmetrical field strength in a system vertical direction from a nadir positioned between the pair of magnets for determining a position of the target.

2. The sensing system of claim 1, wherein each of the pair of sensors are a Hall effect sensor.

3. The sensing system of claim 1, wherein the pair of sensors are spaced apart defining a gap.

4. The sensing system of claim 3, wherein the gap of the pair of sensors is a distance along a parallel plane to the axis of movement.

5. The sensing system of claim 1, further comprising:
   a processor unit,
   wherein the processor unit is configured to detect and determine a differential magnetic field sensed by the pair of sensors, the differential magnetic field is proportional to the position of the target.

6. The sensing system of claim 5, wherein the differential magnetic field is a difference of a first sensed magnetic field in a $B_x$ and $B_z$ direction by one of the pair of sensors and a second sensed magnetic field in a $B_x$ and $B_z$ direction by the other one of the pair of sensors.

7. The sensing system of claim 5, wherein the pair of sensors are integrated within the processor unit.

8. The sensing system of claim 1, wherein the first end of the pair of magnets is a north pole and the second end of the pair of magnets is a south pole.

9. The sensing system of claim 1, wherein each of the pair of magnets are spaced apart to define a gap.

10. The sensing system of claim 9, wherein the pair of magnets are snap fit into a carrier, the carrier is coupled to the target.

11. The sensing system of claim 1, wherein the target is an end of an elongated member.

12. A Hall effect sensor assembly comprising:
  a processor unit,
  a pair of Hall effect sensors spaced apart defining a gap, the pair of Hall effect sensors communicatively coupled to the processor unit;
  a target moves along a linear axis of movement with respect to the pair of Hall effect sensors; and
  a pair of magnets coupled to the target, each of the pair of magnets having a first end and a second end and each end having an opposite polarity, each of the second ends of the pair of magnets are positioned axially adjacent to one another in a system longitudinal direction,
  wherein the pair of magnets provide a symmetrical field strength in a system vertical direction from a nadir positioned between the pair of magnets for determining a position of the target.

13. The Hall effect sensor assembly of claim 12, wherein the gap of the pair of Hall effect sensors is a distance along a parallel plane to the axis of movement.

14. The Hall effect sensor assembly of claim 12, wherein the processor unit is configured to detect and determine a differential magnetic field sensed by the pair of Hall effect sensors, the differential magnetic field is proportional to the position of the target.

15. The Hall effect sensor assembly of claim 14, wherein the differential magnetic field is a difference of a first sensed magnetic field in a $B_x$ and $B_z$ direction by one of the pair of Hall effect sensors and a second sensed magnetic field in a $B_x$ and $B_z$ direction by the other one of the pair of Hall effect sensors.

16. The Hall effect sensor assembly of claim 12, wherein the first end of the pair of magnets is a north pole and the second end of the pair of magnets is a south pole.

17. The Hall effect sensor assembly of claim 12, wherein each of the pair of magnets are spaced apart to define a gap.

18. The sensing system of claim 12, wherein the pair of magnets are snap fit into a carrier, the carrier is coupled to the target.

19. A sensing system that measures a position of a target, the system comprising:
  a pair of sensors; and
  a pair of magnets coupled to the target, each of the pair of magnets having a first end and a second end and each end having an opposite polarity, each of the second ends of the pair of magnets are positioned axially adjacent to one another in a system longitudinal direction,
  wherein the pair of magnets provide a symmetrical field strength in a system vertical direction from a nadir positioned between the pair of magnets for determining a position of the target when the target moves along an axis of movement with respect to the pair of sensors.

* * * * *